Figure 1:
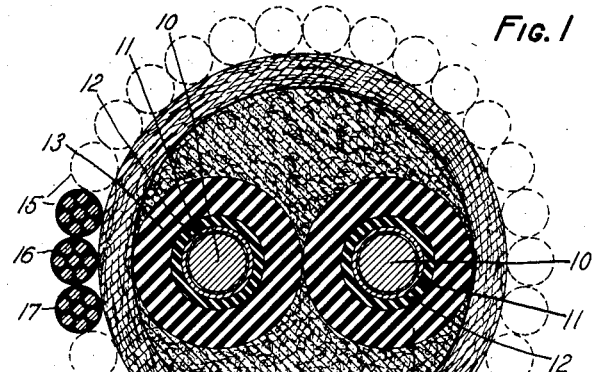

June 30, 1931.  J. J. GILBERT  1,812,630
CABLE ARMORING
Filed Feb. 28, 1929

INVENTOR
J. J. GILBERT
BY
J. W. Schmied
ATTORNEY

Patented June 30, 1931

1,812,630

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

CABLE ARMORING

Application filed February 28, 1929. Serial No. 343,312.

This invention relates to long submarine telephone cables, more particularly of the continuously or coil loaded twin core type although the invention is also applicable to cables of the concentric return type.

An object of the invention is to reduce the losses occurring in submarine cables, especially at telephone frequencies, and consequently to increase the maximum distance of transmission without greater expenditure upon terminal apparatus.

In the early days of submarine cables stranded armor wires were employed on single core cables with sea return but such wires have not recently been used and are generally regarded as being obsolete. Recent researches have indicated that, in accordance with the present invention, important improvements can be effected in submarine telephone and high frequency communication circuits of the twin core type by employing properly designed armor stranded or otherwise finely divided. In twin core and concentric return telephone and telegraph cables the armor wire losses result principally from eddy currents, which in single core cables where the armor wires are part of the signaling circuit, appear in the form of "skin effect" and "proximity effect". An important object of the present invention is to reduce electrical losses, in cable armor, of the type which are relatively unimportant and have hitherto been neglected in the construction of modern telegraph cables. In twin core cables in which both conductors are surrounded by the armor wire the eddy currents are due to the magnetic field of the twin. At telephone and carrier frequencies these losses reach a large value. To a lesser extent the same statement is true of cables of the concentric return type in which the armor is laid up around the return conductor.

In order to obtain efficient results the armor wires in one type of construction adapted for deep sea cable may consist of seven wires stranded together. In order to preserve the wires against corrosion each stranded wire is impregnated with a preservative such as bitumen, tar, or Chatterton's compound and wrapped with tape. A preferred material for the armor wire is high resistivity steel. If the wires are well impregnated the impregnating material will sufficiently insulate the strands from one another. However, if additional insulation is necessary the strands may be covered with enamel, varnish or substances of similar properties which in addition to insulating the strands from one another also, to a degree, tend to prevent corrosion. In the general case the armor may consist of wires arranged of any suitable contour so long as they are finely divided and for this purpose any interlaced or other network of wires of sufficient tensile strength, resistance to corrosion, and a sufficiently fine state of subdivision, may be employed.

Figure 2:
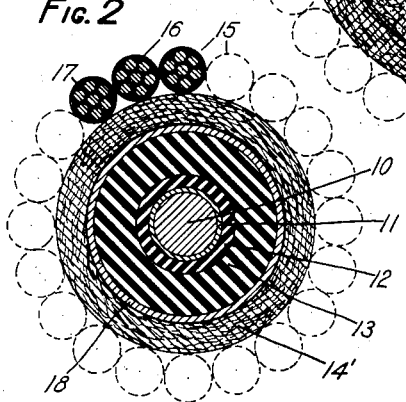
Figure 4:
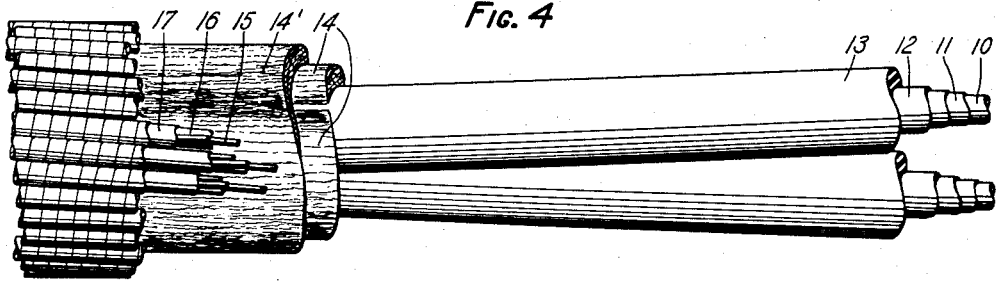
Figure 5:
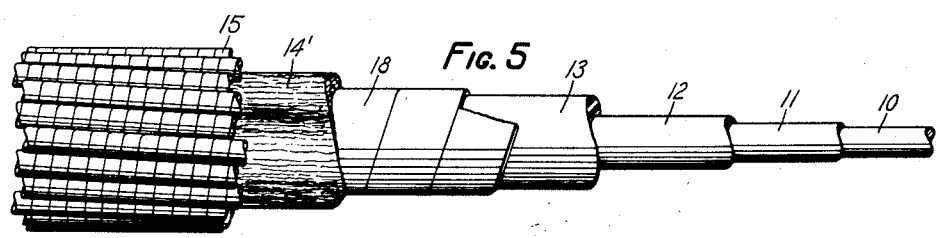

In Figs. 1 and 4 of the accompanying drawings there is illustrated a structure of the twin core type;

In Figs. 2 and 5 a structure of the concentric return type; and

Figure 3:
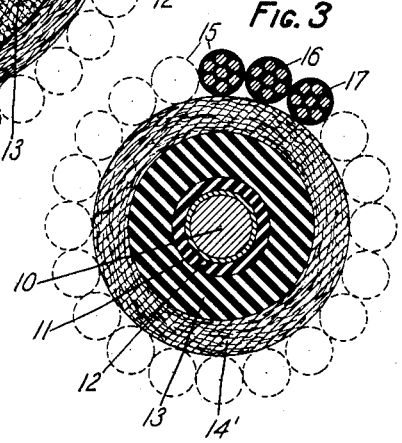

In Fig. 3 a structure of the single core type.

In Figs. 1 and 4 the conductors 10 may be of the solid or plural strand type. They are surrounded by helically applied wire or tape loading material 11 which is impregnated with pressure equalizing material 12 in a manner known in the art and surrounded by the usual gutta percha or other insulation 13. The usual jute layer 14' is next to the insulation. The cores thus formed of the elements 10, 11, 12 and 13 are laid together and formed into a structure of circular dimensions by the application of jute or other worming material 14. Another layer 14' of jute may be applied. About the structure thus formed are laid the armor wires 15 which are thoroughly impregnated with a suitable material 16 such as liquid bitumen and wound with tape 17. The tape is impregnated with ozokerite or similar substance. For deep sea cable each wire may consist of, for example, seven strands. For sections in shallow water where fine armor wires may be somewhat objectionable, each wire may consist of three considerably larger strands twisted together. The armored cable thus constructed is surrounded with impregnated jute in the usual manner.

In Figs. 2 and 5 which illustrate a conductor of the concentric return type the numerals 10, 11, 12 and 13 designate the same elements as the corresponding numerals in Figs. 1 and 4. Around the insulation 13 is applied a low resistance return conductor 18 which may consist of aluminum or copper tape or wire. Upon the return conductor is applied a layer 14 of jute or other equivalent material and upon this are laid the stranded armor wires 15 impregnated with material 16 and taped with tape 17 as stated above in connection with Figs. 1 and 4. The usual preserving and protecting layer is applied outside of the armor wires.

Fig. 3 illustrates the use of stranded armor wires upon a cable of the single core sea return type. The structure is similar to that of Fig. 2, except for the omission of the return conductor 18. The core 10, loading 11, impregnating material 12, insulation 13, jute 14', armor wire 15 with impregnation 16 and taping 17 are as in Fig. 2.

What is claimed is:

1. A submarine telephone or carrier frequency cable having incoming and outgoing conductors enclosed within armor wire, characterized in this, that the armor wire is freely exposed to the magnetic field set up by currents in the conductors, but for the purpose of reducing losses in the armor wire as a result of eddy currents therein the armor wire is finely subdivided.

2. A cable in accordance with claim 1, characterized in this, that the cable is of the twin core type.

3. A cable in accordance with claim 1, characterized in this, that the armor wire consists of several strands thoroughly impregnated with preservative material and that each wire is taped.

4. A cable in accordance with claim 1, characterized in this, that each armor wire consists of several strands insulated from each other by a thin layer of insulating material sufficient to effectively insulate the strands from each other over at least the greater part of their adjacent surfaces.

5. A cable in accordance with claim 1, characterized in this, that the armor wires consist of several strands insulated from each other, thoroughly impregnated with filling material and taped.

6. Submarine signaling cable having stranded armor wires with each wire impregnated with an insulating compound and taped.

In witness whereof, I hereunto subscribe my name this 23rd day of February, 1929.

JOHN J. GILBERT.